March 14, 1933.  W. O. HIGBY ET AL  1,901,241
HYDRAULIC CLUTCH
Filed Feb. 11, 1932
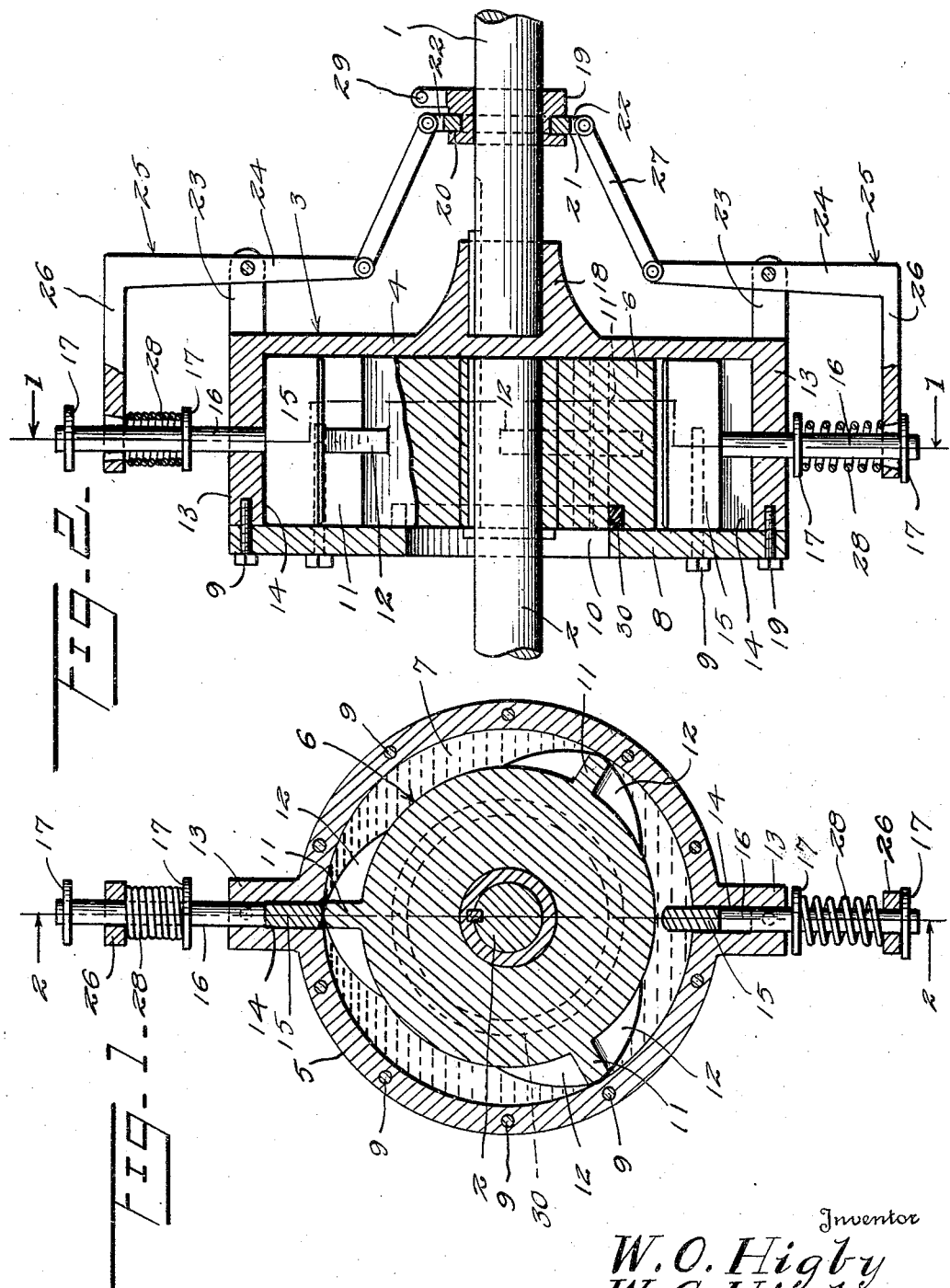
Inventor
W. O. Higby
W. C. Higby
By Watson E. Coleman
Attorney Patented Mar. 14, 1933

1,901,241

UNITED STATES PATENT OFFICE

WILLIS O. HIGBY, OF WEST LEYDEN, AND WILLARD C. HIGBY, OF ITHACA, NEW YORK

HYDRAULIC CLUTCH

Application filed February 11, 1932. Serial No. 592,350.

This invention relates to clutches and similar mechanical devices and pertains particularly to an hydraulic clutch.

The primary object of the present invention is to provide a clutch device having a fluid medium for effecting the locking together in operative relation of two parts, one of which may be connected with a driven and the other to a drive shaft.

Another object of the invention is to provide a clutch having a fluid containing housing in which a fixed quantity of fluid is permanently retained with means whereby the rotary movement of an inserted element relative to the housing may be slowed up or stopped entirely through the operation of means for preventing the free circulation of the fluid.

The invention broadly contemplates the provision of a circular housing which is designed to be connected with a shaft such for example as the drive shaft of a motor vehicle and a rotor member in the housing which is connected with the driven shaft of the vehicle. Extending transversely of the rotor within the housing are paddles, the edges of which engage the inner wall of the housing, and surrounding the rotor in the housing is a suitable fluid.

Extending circumferentially of the rotor at each side of each paddle is a cam which leads to the top edge of the paddle and mounted in the housing to move radially thereof toward the rotor are blades which may be fully projected into the housing to engage the peripheral surface of the rotor in which position they operate to prevent relative turning of the rotor and housing through the trapping of the fluid between them and the adjacent paddles. The slipping of the clutch may be effected by moving the blades slightly away from the rotor so that a narrow passage is provided through which the fluid may pass and thus while effecting the rotation of both the rotor and housing the housing may be permitted to move slightly faster than the rotor. Under these conditions the cams move the blades in and out at the proper periods to permit them to pass over the paddles.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claim.

In the drawing:—

Figure 1 is a vertical sectional view taken transversely of the present clutch device and substantially upon the line 1—1 of Figure 2;

Figure 2 is a sectional view taken longitudinally of the clutch device and substantially upon the line 2—2 of Figure 1.

Referring now more particularly to the drawing wherein like numerals of reference indicate corresponding parts throughout the several views, the numerals 1 and 2 designate the ends of a pair of aligned shafts, one of which may be a drive shaft and the other a driven shaft. For the convenience of description the shaft 1 will be hereinafter referred to as the driving shaft and the shaft 2 as the driven shaft, although it is to be understood that the employment of the clutch device is not to be restricted in this manner, for it will be obvious that this condition may be reversed, if desired.

The clutch structure embodying the present invention comprises a circular housing which is indicated generally by the numeral 3 and which comprises an end wall 4 and a circular side wall 5, and a rotor which is indicated generally by the numeral 6 and which is disposed concentrically with and in the housing 3 as illustrated. As shown in Figure 1 the rotor 6 is of materially smaller diameter than the interior of the housing so that a space 7 is formed about the rotor between the same and the side wall of the housing, which space is filled with a suitable fluid such as oil or the like.

The rotor is of a thickness equal to the interior depth of the housing 3 so that one side abuts the end wall 4 and the other side is engaged by a cover plate 8 which constitutes a second end wall for the housing and which is removably secured thereto by means of the bolts 9 or by any other suitable means. The cover plate 8 has a central opening 10 therethrough through which the shaft 2 passes, the shaft being keyed or otherwise suitably secured in the rotor as illustrated.

At equi-distantly spaced points about the periphery of the rotor 6 are paddle elements each of which is indicated by the numeral 11 and each of which extends across the peripheral surface of the disk from one side to the other. The free longitudinal edges of these paddles 11 closely engage the inner surface of the wall 5 of the housing so that the fluid located between the paddles will rotate in the housing with the rotor 6.

Extending circumferentially of the rotor 6 upon each side of each paddle 11 is a cam 12 so that each paddle is disposed between a pair of these cams as illustrated and the surface of each cam rises from the periphery of the rotor 6 to the top edge of the adjacent paddle.

At diametrically opposite points the wall 5 of the housing 3 is materially increased in thickness as indicated at 13 and each of these thickened portions has a recess 14 therein which opens into the interior of the housing and which extends the full width thereof as illustrated in Figure 2. In each of the recesses 14 is a blade 15 to the outer edge of which is attached one edge of a stem 16 which extends outwardly through a suitable passageway in the enlargement of the housing 13 to the exterior of the latter.

Upon the outer end of each stem there are secured in spaced relation and against movement a pair of disks, each of which is indicated by the numeral 17.

To the central portion of the outer face of the end wall 4 of the housing is secured a hub 18 into which extends an end of the shaft 1, the latter being suitably keyed to the hub as illustrated.

Surrounding the shaft 1 is a circumferentially grooved collar 19 the groove therein being indicated by the numeral 20 and in this groove is fitted a ring 21 to which are attached at diametrically opposite points ears 22.

Attached to the casing 3 at points adjacent the enlarged parts 13 thereof are arms 23 to each of these arms is pivotally attached one arm 24 of a substantially L-shaped lever which is indicated as a whole by the numeral 25, the other arm of each lever being indicated by the numeral 26 and having its free end apertured to receive the adjacent stem 16 between the disks 17 thereof. The free end of the arm 24 of each of the members 25 is pivotally attached to one end of a link 27, the other end of which is pivotally attached to an ear 22 of the collar 21.

Surrounding each of the stems 16 between the inner disk 17 thereof and the arm 26 of the adjacent member 25 is a coil compression spring 28.

The collar 19 is connected in any suitable manner as for example through the medium of an ear 29 with a suitable operating lever (not shown) such as a foot brake or the like, the position of which lever may be controlled by a suitable spring element.

In the operation of the present clutch device when the collar 19 is moved on the shaft 1 away from the casing 3 the crank arms 25 will be oscillated to force the blades inwardly until their inner longitudinal edges come into contact with the peripheral surface of the rotor 6. It will thus be seen that relative movement between the rotor and casing cannot occur due to the fact that the fluid in the casing will be trapped or compressed between each of the blades 15 and an adjacent paddle 11. The clutch will thus be in engaged position so that the shafts 1 and 2 will turn together.

To release the clutch the collar 19 is shifted toward the casing so as to draw the blades 15 outwardly and thus permit the fluid in the casing to rotate freely with the rotor 6.

By projecting the blades 15 inwardly only part of the way it will be seen that a small passage will remain between the periphery of the rotor 6 and the blades so that, while relative rotary movement between the rotor and casing may take place, the casing will turn at a greater speed than the rotor due to the fact that the fluid will pass slowly between the blades 15 and the rotor periphery. It is during this operation of the clutch that the cams 12 come into service for it will be readily apparent that if a slipping of the clutch is to be had the blades 15 will have to pass the paddles. The blades 15, therefore, ride up on the advancing cam 12 and over the top of the paddle and then ride down upon the following cam to the position formerly occupied. Figure 1 illustrates one blade in the position assumed as a paddle is passing therebeneath and the other blade in its normal position when the clutch is being slipped. It will be seen that by forming the cam members 12 of narrow width areas will be left at the sides thereof so that a trapping of the fluid cannot occur as the blades 15 pass over the paddles as would be the case if the cams extended the full width of the casing and the rotor.

In order to prevent leakage of the fluid from the casing between the cover wall 8 and the adjacent side of the rotor, a suitable packing 30 is placed in a groove in the face of the rotor, which bears against the inner surface of the plate in the manner illustrated in Figure 2.

While the structure described has been referred to throughout the specification as a clutch it is to be understood that its use is not to be limited to the duties of a clutch for it will be apparent that the device may readily be employed as a brake and in other capacities.

Having thus described the invention, what is claimed is:—

A clutch of the character described comprising a casing formed to provide a circular chamber and having a side wall, an end wall integral with the side wall, and a second end wall removably attached to the side wall, means for coupling one end of a shaft to the radial center of the first mentioned end wall, a rotor within the chamber and concentric with said shaft, a second shaft secured at one end in the radial center of the rotor and extending through the removable end wall, said rotor being of materially less diameter than the chamber, a plurality of paddles disposed transversely of the periphery of the rotor and extending the full width thereof and further engaging at their free edges the wall of the chamber, said casing side wall having diametrically opposed recesses therein opening into the chamber, a blade reciprocably mounted in each of said recesses for extension into the chamber for contact with said rotor, said chamber containing a fluid surrounding the rotor, a stem carried by each of said blades and extending through the casing wall to the exterior thereof, a pair of lever members each having two angularly disposed arms and each further having one arm pivotally attached to the casing adjacent a stem and having its other arm arranged with the adjacent stem slidably extended therethrough, a pair of stops carried by each stem with the attached arm disposed therebetween, a spring member surrounding each stem between the inner stop and the attached arm, means for oscillating said levers, and cam means carried by the rotor at each side of each paddle for facilitating the passing of the paddles and blades in the slipping of the clutch.

In testimony whereof we hereunto affix our signatures.

WILLIS O. HIGBY.
WILLARD C. HIGBY.